United States Patent
Albano et al.

(10) Patent No.: US 6,395,834 B1
(45) Date of Patent: *May 28, 2002

(54) FLUOROELASTOMER COMPOSITIONS

(75) Inventors: Margherita Albano, Milan; Marco Apostolo, Novara; Vincenzo Arcella, Milan; Enrico Marchese, Asti, all of (IT)

(73) Assignee: Ausimont S.p.A., Milan (IT)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/511,949

(22) Filed: Feb. 23, 2000

(30) Foreign Application Priority Data

Feb. 23, 1999 (IT) ............................................ MI99A0357

(51) Int. Cl.$^7$ ............................ C08L 27/18; C08L 27/12
(52) U.S. Cl. ...................... 525/199; 525/200; 525/214; 525/221; 525/222; 525/240; 525/241
(58) Field of Search ................................ 525/199, 200, 525/214, 221, 222, 240, 241

(56) References Cited

U.S. PATENT DOCUMENTS

| | | | |
|---|---|---|---|
| 4,035,565 A | 7/1977 | Apotheker et al. | 526/249 |
| 4,243,770 A | 1/1981 | Tatemoto et al. | 525/331 |
| 4,281,092 A | 7/1981 | Breazeale | 526/247 |
| 4,394,489 A | 7/1983 | Aufdermarsh | 525/370 |
| 4,564,662 A | 1/1986 | Albin | 526/247 |
| 4,694,045 A | 9/1987 | Moore | 525/276 |
| 4,745,165 A | 5/1988 | Arcella et al. | 526/247 |
| 4,789,717 A | 12/1988 | Giannetti et al. | 526/209 |
| 4,864,006 A | 9/1989 | Giannetti et al. | 526/209 |
| 4,879,362 A | 11/1989 | Morgan | 526/247 |
| 4,904,726 A | 2/1990 | Morgan et al. | 524/520 |
| 4,943,622 A | 7/1990 | Naraki et al. | 526/206 |
| 5,173,553 A | 12/1992 | Albano et al. | 526/238 |
| 5,275,887 A | 1/1994 | Johnson et al. | 428/422 |
| 5,447,993 A | 9/1995 | Logothetis | 525/273 |
| 5,468,782 A | 11/1995 | Mehan | 521/134 |
| 5,523,346 A | 6/1996 | Wu | 524/805 |
| 5,616,648 A | 4/1997 | Wu | 524/805 |
| 5,767,204 A | 6/1998 | Iwa et al. | 525/359.3 |
| 5,789,489 A | 8/1998 | Coughlin et al. | 525/370 |
| 5,789,509 A | 8/1998 | Schmiegel | 526/247 |

FOREIGN PATENT DOCUMENTS

| | | |
|---|---|---|
| EP | 0 127 407 A2 | 12/1984 |
| EP | 0 136 596 A2 | 4/1985 |
| EP | 0 199 138 A2 | 10/1986 |
| EP | 0 410 351 A1 | 1/1991 |
| EP | 0 661 304 B1 | 7/1995 |
| EP | 0 769 520 A1 | 4/1997 |
| EP | 0 860 436 A1 | 8/1998 |
| IT | MI98A 001519 | 7/1998 |
| IT | MI98A 001880 | 8/1998 |
| WO | WO 95/02634 | 1/1995 |
| WO | WO 97/05122 | 2/1997 |

OTHER PUBLICATIONS

JP 57–107336, Patent Abstracts of Japan, Unexamined Applications, Section M, No. 163, vol. 6, No. 2, p. 17.

*Primary Examiner*—Nathan M. Nutter
(74) *Attorney, Agent, or Firm*—Arent Fox Kintner Plotkin Kahn PLLC

(57) ABSTRACT

Fluoropolymers comprising a fluoroelastomer matrix incorporating therein particles of a semicrystalline fluoropolymer formed of tetrafluoroethylene (TFE) homopolymers or copolymers, wherein the average particle sizes of the semicrystalline fluoropolymer latex range from 10 to 100 nm.

22 Claims, No Drawings

FLUOROELASTOMER COMPOSITIONS

The present invention relates to fluoropolymers essentially formed by a mixture of a fluoroelastomer and a semicrystalline fluoropolymer usable for sealing manufactured articles in the electronic, optical and pharmaceutical industry.

More specifically the present invention relates to fluoropolymers formed by a mixture of a fluoroelastomer and a semicrystalline fluoropolymer, characterized by improved mechanical properties combined with good properties of elastic retention (lower compression set) and very good surface appearance without roughness. It is well known that one of the fluoroelastomer uses is the preparation of O-rings for seals: for this application it is essential that the O-ring surface is smooth.

The use of fluoroelastomers containing polytetrafluoroethylene (PTFE) particles to improve the properties of abrasion-resistance and of hot tearing the obtained manufactured articles is known in the prior art. As described in Japanese patent 57-107,336, the fluoroelastomer abrasion-resistance is improved by physically mixing solid curable fluoroelastomers with PTFE powders having a low molecular weight, in the range 500–200,000 as average molecular weight by number ($M_n$). Said PTFE is prepared by thermal decomposition at a temperature between 450° C. and 600° C. for prolonged times or by irradiation with ionic radiation of high molecular weight PTFE. An alternative method for obtaining PTFE having a low molecular weight is that to polymerize TFE in the presence of chain transfer agents. The fluoroelastomer and the PTFE powders are mixed in Banbury or in calender.

In U.S. Pat. Nos. 4,879,362 and 4,904,726 mixtures of fluoroelastomers with resins of PTFE modified with the addition of comonomers such as hexafluoropropene (HFP), perfluoropropylvinylether (PPVE), etc., are used, in order to avoid PTFE fibrillation problems without losing the reinforcement properties that the PTFE gives to the obtained fluoroelastomers. The comonomer results much more present on the polymeric particle surface, so as to allow an uniform distribution in the fluoroelastomer without the formation of visible agglomerates. The latter should be the cause of fibrillation phenomena.

In EP 708,797 fluoroelastomer compositions formed by a fluoroelastomer and by a semicrystalline fluorinated filler in the form of micropowder which are obtained in curing compounds not containing metal species, are described. Said compositions give a low release of metal species under conditions where an high purity is required, but they show poor mechanical properties. Tests carried out by the Applicant (see the comparative Examples), have shown that the surface of the manufactured articles obtained from said fluoroelastomer compositions shows roughness. It is well known that in the O-ring preparation, typical fluoroelastomer application, surfaces having a low roughness in order to obtain good sealing properties, are required. The semicrystalline fluorinated filler is based on PTFE or PTFE modified with a comonomer and obtained by emulsion or suspension polymerization. The high molecular weight PTFE is subjected to irradiation, as above said, in order to reduce the molecular weight. This makes easier the PTFE milling produced by a suspension process; it eliminates the fibrillation and reduces the PTFE agglomeration obtained by an emulsion process.

The need was felt to have available fluoroelastomer compositions comprising a semicrystalline fluorinated filler having improved properties compared with those of the prior art and specifically with the following property combination:

improved mechanical properties
good elastic retention properties (lower compression set—very good seal)
very good surface appearance roughness free.

The Applicant has unexpectedly and surprisingly found that it is possible to obtain the combination of the above mentioned properties, by incorporating in the fluoroelastomer matrix PTFE particles or its copolymers having well defined sizes as specified hereinafter.

It is therefore an object of the present invention fluoropolymers comprising a fluoroelastomer matrix incorporating therein particles of a semicrystalline fluoropolymer latex formed by tetrafluoroethylene (TFE) homopolymers, or TFE copolymers with one or more monomers containing at least one ethylene unsaturation in amounts ranging from 0.01% to 10% by moles, preferably from 0.05% to 5% by moles, wherein the average particle sizes of the semicrystalline fluoropolymer latex range from 10 to 100 nm, preferably from 10 to 60 nm. Also semycrystalline fluoropolymers wherein the latex particle sizes have the above mentioned value for at least 60% by weight, preferably 70% by weight of the semicrystalline fluoropolymer, can be used.

The invention compositions are obtainable by mixing the semicrystalline fluoropolymer latex with the fluoroelastomer latex and subsequent coagulation. Alternatively the invention compositions can be polymerized in the same reactor in two subsequent steps: in a first step the semicrystalline fluoropolymer with the mentioned nanometric sizes is polymerized and in a second step the fluoroelastomer is polymerized. By operating in this way the fluoroelastomer should cover the semicrystalline fluoropolymer latex particles, allowing to obtain a very good dispersion of the latter in the fluoroelastomer.

The semicrystalline fluoropolymer amount inside the fluoroelastomer matrix is in the range 2%–40% by weight, preferably 5–30% by weight, more preferably 10–20% by weight on the total of the polymeric mixture.

The semicrystalline fluoropolymer particles having the above mentioned sizes are obtainable for example by a polymerization process in an aqueous microemulsion of perfluoropolyoxyalkylenes as described for example in the European patent application EP 99112083.3 in the name of the Applicant, herein incorporated by reference. Microemulsion polymerization methods can also be used, wherein the oil phase is formed by polymerizable unsaturated monomers, as described in U.S. Pat. No. 5,523,346 and in U.S. Pat. No. 5,616,648.

The fluoroelastomers can be prepared by copolymerization of the monomers in aqueous emulsion, according to well known methods in the prior art, in the presence of radical initiators (for example alkaline or ammonium persulphates, perphosphates, perborates, percarbonates), optionally in combination with ferrous, cuprous or silver salts, or of other easily oxidizable metals. In the reaction medium also surfactants of various kind, among which the fluorinated surfactants are particularly preferrred, are usually present.

Alternatively the fluoroelastomers can be prepared in bulk or in suspension, in an organic liquid in which a suitable radical initiator is present, according to well known techniques.

The polymerization reaction is generally carried out at temperatures in the range 25°–150° C., under a pressure up to 10 MPa.

The fluoroelastomers are preferably prepared in microemulsion of perfluoropolyoxyalkylens, according to U.S. Pat. Nos. 4,789,717 and 4,864,006.

The Applicant has found that in order to obtain the results of the present invention it is essential that the semi-crystalline fluoropolymer filler latex has the mentioned nanometric sizes, while the size of the latex of the fluoroelastomer is not critical.

When the semi-crystalline fluorinated filler is based on modified PTFE, for its preparation comonomers having an ethylene unsaturation both of hydrogenated and fluorinated type, can be used. Among those hydrogenated, ethylene, propylene, acrylic monomers, for example methylmethacrylate, (meth)acrylic acid, butylacrylate, hydroxyethylhexyl-acrylate, styrene monomers can be mentioned.

Among the fluorinated comonomers we can mention:

perfluoroolefins $C_3-C_8$, such as hexafluoropropene (HFP), hexafluoroisobutene;

hydrogenated fluorolefins $C_2-C_8$, such as vinyl fluoride (VF), vinylidene fluoride (VDF), trifluoroethylene, perfluoroalkylethylene $CH_2=CH-R_f$, wherein $R_f$ is a perfluoroalkyl $C_1-C_6$;

chloro- and/or bromo- and/or iodo-fluoroolefins $C_2-C_8$, such as chlorotrifluoroethylene (CTFE);

(per)fluoroalkylvinylethers (PAVE) $CF_2=CFOR_f$, wherein $R_f$ is a (per)fluoroalkyl $C_1-C_6$, for example $CF_3$, $C_2F_5$, $C_3F_7$;

(per)fluoro-oxyalkylvinylethers $CF_2=CFOX$, wherein X is: an alkyl $C_1-C_{12}$, or an oxyalkyl $C_1-C_{12}$, or a (per)fluorooxyalkyl $C_1-C_{12}$ having one or more ether groups, for example perfluoro-2-propoxy-propyl; fluorodioxoles, preferably perfluorodioxoles.

PAVEs are preferred comonomers, specifically perfluoromethyl-, ethyl-, propylvinylether and fluorodioxoles, preferably perfluorodioxoles.

The fluoroelastomers used in the present invention belong to the following classes:

(1) VDF-based copolymers, wherein VDF is copolymerized with at least one comonomer selected from the following: perfluoroolefins $C_2-C_8$, such as tetrafluoroethylene (TFE), hexafluoropropene (HFP); chloro- and/or bromo- and/or iodo-fluoroolefins $C_2-C_8$, such as chlorotrifluoroethylene (CTFE) and bromotrifluoroethylene; (per)fluoroalkylvinylethers (PAVE) $CF_2=CFOR_f$, wherein $R_f$ is a (per)-fluoroalkyl $C_1-C_6$, for example trifluoromethyl, bromodifluoromethyl, pentafluoropropyl; perfluorooxyalkylvinylethers $CF_2=CFOX$, wherein X is a perfluorooxyalkyl $C_1-C_{12}$ having one or more ether groups, for example perfluoro-2-propoxy-propyl; non fluorinated olefins (Ol) $C_2-C_8$, for example ethylene and propylene;

(2) TFE-based copolymers, wherein TFE is copolymerized with at least one comonomer selected from the following: (per)fluoroalkylvinylethers (PAVE) $CF_2=CFOR_f$, wherein $R_f$ is as above defined; perfluorooxyalkylvinylethers $CF_2=CFOX$, wherein X is as above defined; fluoroolefins $C_2-C_8$ containing hydrogen and/or chloro and/or bromo and/or iodo atoms; non fluorinated olefins (Ol) $C_2-C_8$; perfluorovinylethers containing hydrocyanic groups as described in U.S. Pat. Nos. 4,281,092, 5,447,993, 5,789,489.

Preferably the invention fluoroelastomers contain perfluorinated monomers, and preferably the base structure of these fluoroelastomers is selected from the copolymers of class (2), wherein TFE is polymerized with one or more perfluorinated comonomers as above mentioned.

Within the above defined classes, preferred compositions by moles of the monomers forming the base structure of the fluoroelastomer are the following:

(a) vinylidene fluoride (VDF) 45–85%, hexafluoropropene (HFP) 15–45%, tetrafluoroethylene (TFE) 0–30%;

(b) vinylidene fluoride (VDF) 50–80%, perfluoroalkylvinylether (PAVE) 5–50%, tetrafluoroethylene (TFE) 0–20%;

(c) vinylidene fluoride (VDF) 20–30%, non fluorinated olefins (Ol) $C_2-C_8$ 10–30%, hexafluoropropene (HFP) and/or perfluoroalkylvinylether (PAVE) 18–27%, tetrafluoroethylene (TFE) 10–30%;

(d) tetrafluoroethylene (TFE) 50–80%, perfluoroalkylvinylether (PAVE) 20–50%;

(e) tetrafluoroethylene (TFE) 45–65%, non fluorinated olefins (Ol) $C_2-C_8$ 20–55%, vinylidene fluoride 0–30%;

(f) tetrafluoroethylene (TFE) 32–60% by moles, non fluorinated olefins (Ol) $C_2-C_8$ 10–40%, perfluoroalkylvinylether (PAVE) 20–40%;

(g) tetrafluoroethylene (TFE) 33–75%, perfluoroalkylvinylether (PAVE) 15–45%, vinylidene fluoride (VDF) 5–30%.

Specific particularly preferred compositions are:

(d) TFE 50–80%, PAVE 20–50%;

(g) TFE 33–75%, PAVE 15–45%, VDF 5–30%.

Optionally the fluoroelastomers comprise also monomer units deriving from a bis-olefin having general formula:

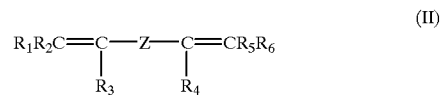

(II)

wherein:

$R_1, R_2, R_3, R_4, R_5, R_6$, equal to or different from each other, are H or alkyls $C_1-C_5$;

Z is a linear or branched, alkylene or cycloalkylene $C_1-C_{18}$ radical, optionally containing oxygen atoms, preferably at least partially fluorinated, or a (per)fluoropolyoxyalkylene radical, as described in EP 661,304 in the name of the Applicant.

The unit amount in the chain deriving from said bisolefins is generally in the range 0.01–1.0 by moles, preferably 0.03–0.5 by moles, still more preferably 0.05–0.2% by moles for 100 moles of the other above mentioned monomer units forming the fluoroelastomer base structure.

The fluoropolymers of the present invention can be cured by peroxidic route, wherefore they preferably contain along the chain and/or in terminal position of the macromolecules iodine and/or bromine atoms. The introduction of such iodine and/or bromine atoms can be achieved by addition, in the reaction mixture, of brominated and/or iodinated cure-site comonomers, such as bromo and/or iodo olefins having from 2 to 10 carbon atoms (as described for example in U.S. Pat. Nos. 4,035,565 and 4,694,045), or iodo and/or bromo fluoroalkylvinylethers (as described in U.S. Pat. Nos. 4,745,165, 4,564,662 and EP 199,138), in such amounts so that the content of cure-site comonomers in the final product is generally in the range 0.05–2 moles for 100 moles of the other base monomer units.

Other usable iodinated compounds are the triodinated deriving from triazines as described in European patent application EP 860,436 and in the European patent application EP 99114823.0.

Alternatively or also in association with the cure-site comonomers it is possible to introduce iodine and/or bromine end atoms by addition to the reaction mixture of iodinated and/or brominated chain transfer agents, such as for example the compounds of formula $R_f(I)_x(Br)_y$, wherein $R_f$ is a (per)fluoroalkyl or a (per)fluorochloroalkyl having from 1 to 8 carbon atoms, while x and y are integers between 0 and 2, with $1 \leq x+y \leq 2$ (see for example U.S. Pat. Nos. 4,243,770 and 4,943,622). It is also possible to use, as chain transfer agents, alkaline or earth-alkaline metal iodides and/or bromides, according to U.S. Pat. No. 5,173,553.

In association with the chain transfer agents containing iodine and/or bromine, other chain transfer agents known in the prior art, such as ethyl acetate, diethylmalonate, etc., can be used.

Curing by peroxidic route is carried out, according to known techniques, by addition of a suitable peroxide capable to generate radicals by thermal decomposition. Among the most commonly used we mention: dialkylperoxides, such as for example di-terbutyl-peroxide and 2,5-dimethyl-2,5-di-(terbutylperoxy)hexane; dicumyl peroxide; dibenzoyl peroxide; diterbutyl perbenzoate; di[1,3-dimethyl-3-(terbutylperoxy)-butyl]carbonate. Other peroxidic systems are described, for example, in European patent applications EP 136,596 and EP 410,351.

To the compound (curable blend) other products are then added, such as:

(a) curing coagents, in an amount generally in the range 0.5–10%, preferably 1–7% by weight with respect to the polymer; among them, triallyl-cyanurate; triallyl-isocyanurate (TAIC); tris(diallylamine)-s-triazine; triallylphosphite; N,N-diallyl-acrylamide; N,N,N',N'-tetraallyl-malonamide; trivinyl-isoyanurate; 2,4,6-trivinyl-methyltrisiloxane, etc., are commonly used; TAIC is particularly preferred; other preferred crosslinking agents are bis-olefins described in the European patent application EP 769,520. Other crosslinking agents which can be used are the triazines described in the European patent applications EP 860,436 and WO97/05122.

(b) optionally a metal compound, in an amount in the range 1–15%, preferably 2–10%, by weight with respect to the polymer, selected from oxides or hydroxides of divalent metals, such as for example, Mg, Zn, Ca or Pb, optionally associated to a weak acid salt, such as for example stearates, benzoates, carbonates, oxalates or phosphites of Ba, Na, K, Pb, Ca;

(c) optionally acid acceptors of the non metal oxide type, such as 1,8 bis dimethyl amino naphthalene, octadecylamine etc. as described in EP 708,797.

(d) other conventional additives, such as thickening fillers, pigments, antioxidants, stabilizers and the like.

When the fluoroelastomer matrix contains cyano groups, the fluoropolymer curing of the present invention is carried out by using as crosslinking agents tin organic compounds or di-aromatic aminic compounds, as described in U.S. Pat. Nos. 4,394,489, 5,767,204, 5,789,509. This type of curing can be associated to a curing of peroxidic type, when the fluoroelastomer matrix contains iodine or bromine atoms, preferably end atoms, as described in U.S. Pat. No. 5,447,993.

The present invention will be better illustrated by the following Examples, which have a merely indicative but not limitative purpose of the scope of the invention itself.

EXAMPLE 1 a) Preparation of the Semicrystalline Fluoropolymer

In a 10 l autoclave, equipped with a stirrer working at 545 rpm, after evacuation, 6.5 l of demineralized water and 272 ml of a perfluoropolyoxyalkylene microemulsion were introduced: the latter was previously obtained by mixing:

59 ml of a perfluoropolyoxyalkylene, having an acid end group, of formula:

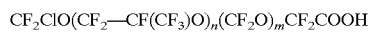
$$CF_2ClO(CF_2-CF(CF_3)O)_n(CF_2O)_mCF_2COOH$$

wherein n/m=10, having average molecular weight of 600;

59 ml of a 30% by volume $NH_4OH$ aqueous solution;

118 ml of demineralized water;

36 ml of Galden$_{(®)}$ D02 of formula:

$$CF_3O(CF_2-CF(CF_3)O)_n(CF_2O)_mCF_3$$

wherein n/m=20, having average molecular weight of 450.

The autoclave was then heated up to 80° C. and maintained at said temperature for the whole reaction duration. 0.48 bar of $C_2H_6$ were fed into the autoclave and the pressure was increased and maintained constant at 11 bar during the whole polymerization with TFE.

6.5 g of ammonium persulphate (APS) as initiator agent were then introduced into the autoclave. After 37 minutes of reaction, the autoclave was cooled and the latex discharged. The latex characteristics are reported in Table 1.

b) Preparation of the Fluoroelastomer

In a 10 l autoclave, equipped with a stirrer working at 545 rpm, after evacuation, 6.5 l of demineralized water and 67 ml of a perfluoropolyoxyalkylene microemulsion were introduced: the latter was previously obtained by mixing:

14.5 ml of a perfluoropolyoxyalkylene, having an acid end group, of formula:

$$CF_2ClO(CF_2-CF(CF_3)O)_n(CF_2O)_mCF_2COOH$$

wherein n/m=10, having average molecular weight of 600;

14.5 ml of a 30% by volume $NH_4OH$ aqueous solution;

29 ml of demineralized water;

9 ml of Galden$^{(®)}$ D02 of formula:

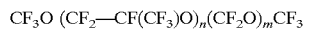
$$CF_3O(CF_2-CF(CF_3)O)_n(CF_2O)_mCF_3$$

wherein n/m=20, having average molecular weight of 450.

The autoclave was then heated up to 80° C. and maintained at said temperature for the whole reaction duration. The following mixture of monomers was then fed:

| perfluoromethylvinylether (PMVE) | 60% by moles |
| tetrafluoroethylene (TFE) | 40% by moles | so as to increase the pressure to 25 bar.

0.32 g of ammonium persulphate (APS) as initiator agent;

26 g of 1,6-diiodoperfluorohexane ($C_6F_{12}I_2$) as chain transfer agent;

5 g of bis-olefin of formula $CH_2=CH-(CF_2)_6-CH=CH_2$; the addition was carried out in 20 portions, each of 0.25 g, starting from the polymerization beginning and for every 5% increase in the monomer conversion, were then introduced in the autclave.

The 25 bar pressure was maintained constant for the whole duration of the polymerization by feeding a mixture formed by:

| perfluoromethylvinylether (PMVE) | 40% by moles |
| tetrafluoroethylene (TFE) | 60% by moles |

After 137 minutes of reaction, the autoclave was cooled and the latex discharged. The latex properties are reported in Table 1.

c) Mixing of the Latexes—Preparation of the Final Polymer 635.6 ml of the latex obtained in Example 1a are mixed with 1517 ml of the Example 1b latex. After mixing, the latex is coagulated with an aluminum sulphate solution (6 g of $Al_2(SO_4)_3$ for every litre of latex) and dried at 80° C. in an air-circulating oven for 10 hours. 500 g of polymer, characterized as shown in Table 2, were obtained.

EXAMPLE 2 (comparative)

a) Preparation of the Semicrystalline Fluoropolymer

In a 50 l autoclave, equipped with a stirrer working at 245 rpm, 32 l of demineralized water, 12 g of ammonium perfluorooctanoate and 140 g of paraffin with melting point 52–56° C. were introduced, after evacuation.

The autoclave was then heated to 89° C. and progressively increased up to 102.1° C. with a rate of 1° C. per minute for the whole reaction duration. 350 mbar of ethane were fed into the autoclave and the pressure was increased and maintained at 20 bar by continuously feeding TFE during the polymerization.

3.5 g of ammonium prsulphate (APS) as initiator agent and subsequently further 2 g of an APS aqueous solution at a flow-rate of 50 cc/min were introduced in the autoclave.

After 73 minutes of reaction, the autoclave was cooled and the latex discharged. The latex characteristics are reported in Table 1.

b) Preparation of the Fluoroelastomer

The fluoroelastomer latex was obtained as described in Example 1b.

c) Mixing of the Latexes—Preparation of the Final Polymer 428.5 ml of the latex obtained in Example 2a are mixed with 1517 ml of the Example 2b latex. After mixing, the latex is coagulated with an aluminum sulphate solution (6 g of $Al_2(SO_4)_3$ for every litre of latex) and dried at 80° C. in an air-circulating oven for 10 hours. 500 g of polymer, characterized as shown in Table 2, were obtained.

EXAMPLE 3 (comparative)

a) Preparation of the Semicrystalline Fluoropolymer

The PTFE latex was obtained in the presence of a microemulsion as in Example 1a. The latex was subsequently coagulated with an aluminum sulphate solution (6 g of $Al_2(SO_4)_3$ for each litre of latex) and dried at 150° C. in an air-circulation oven for 24 hours.

b) Preparation of the Fluoroelastomer

The perfluoroelastomer latex was obtained as described in Example 1b. The latex was subsequently coagulated with an aluminum sulphate solution (6 g of $Al_2(SO_4)_3$ for each litre of latex) and dried at 100° C. in an air-circulation oven for 12 hours.

c) Mechanical Mixing—Preparation of the Final Polymer 425 g of fluoroelastomer of Example 3b were mixed with 75 g of PTFE powder obtained from Example 3a in an open mixer with rollers heated at 60° C. In the mixing process the perfluoroelastomer is introduced first with the rollers completely near the one to the other and mixed until a continuous polymer film is obtained. The PTFE powder was then added until obtaining an uniform mixing. The obtained mixture was characterized as reported in Table 2.

EXAMPLE 4 (comparative)

425 g of fluoroelastomer obtained in Example 3b were mixed in an open mixer with 75 g of PTFE MP 1600 by Du Pont by using the procedure described in Example 3c. The mixture properties are reported in Table 2.

EXAMPLE 5 a) Preparation of the Semicrystalline Fluoropolymer

In a 50 l autoclave, equipped with a stirrer working at 245 rpm, after evacuation, 32 l of demineralized water, 140 g of a paraffin with melting point 52°–56° C. and 300 ml of a perfluoropolyoxyalkylene microemulsion were introduced: the latter was previously obtained by mixing:

65 ml of a perfluoropolyoxyalkylene, having an acid end group, of formula:

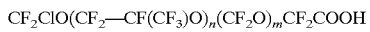

wherein n/m=10, having average molecular weight of 600;

65 ml of a 30% by volume $NH_4OH$ aqueous solution;

130 ml of demineralized water;

40 ml of Galden® D02 of formula:

wherein n/m=20, having average molecular weight of 450.

The autoclave was then heated up to 80° C. and the temperature was progressively increased up to 96° C. with a rate of 0.6° C./min for the whole reaction duration. 370 mbar of $C_2H_6$ were fed into the autoclave and the pressure was increased and maintained constant at 20 bar during the whole polymerization by feeding TFE.

2.5 g of ammonium persulphate (APS) as initiator agent were then introduced into the autoclave and subsequently by feeding, starting from 10% of conversion, 0.54 g of APS every 10% of monomer conversion. After 64 minutes of reaction, the autoclave was cooled and the latex discharged. The latex characteristics are reported in Table 3.

b) Preparation of the Fluoroelastomer

The fluoroelastomer latex was obtained as described in Example 1b, except that the amount of 1,6-diiodoperfluorohexane was of 30 g instead of 26 g.

c) Mixing of the Latexes—Preparation of the Final Polymer 347 ml of the latex obtained in Example 5a are mixed with 1197 ml of the Example 5b latex. After mixing, the latex is coagulated with an aluminum sulphate solution (6 g of Al$_2$(SO$_4$)$_3$ for each litre of latex) and dried at 80° C. in an air-circulating oven for 10 hours. 500 g of polymer, characterized as shown in Table 4, were obtained.

EXAMPLE 6

In a 10 l autoclave, equipped with a stirrer working at 545 rpm, after evacuation, 6.5 l of demineralized water and 260 ml of a perfluoropolyoxyalkylene microemulsion were introduced: the latter was previously obtained by mixing:

56.3 ml of a perfluoropolyoxyalkylene having an acid end group of formula:

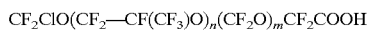

CF$_2$ClO(CF$_2$—CF(CF$_3$)O)$_n$(CF$_2$O)$_m$CF$_2$COOH wherein n/m=10, having average molecular weight of 600;

56.3 ml of a 30% by volume NH$_4$OH aqueous solution;

112.7 ml of demineralized water;

34.7 ml of Galden$^®$ D02 of formula:

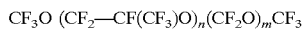

CF$_3$O (CF$_2$—CF(CF$_3$)O)$_n$(CF$_2$O)$_m$CF$_3$ wherein n/m=20, having average molecular weight of 450.

The autoclave was then heated up to 80° C. and maintained at said temperature for the whole reaction duration. 0.48 bar of ethane were fed into the autoclave and the pressure was increased and maintained constant at 11 bar by continuously feeding TFE during the polymerization.

6.5 g of ammonium persulphate (APS) were then introduced into the autoclave as initiator. After 15 minutes of reaction, the autoclave was cooled, degassed and discharged. The latex characteristics are reported in Table 3. Subsequently 2368 ml (corresponding to 449.9 g of polymer) of the latex are introduced again in the 10 litre reactor to which 4132 litres of demineralized water are added. The autoclave is then brought to 90° C. and maintained for one hour at said temperature in order to decompose all the residual initiator agent. Subsequently the temperature is increased to 80° C. and maintained constant for the whole duration of the polymerization. The following mixture of monomers was then fed:

| | |
|---|---|
| perfluoromethylvinylether (PMVE) | 60% by moles |
| tetrafluoroethylene (TFE) | 40% by moles | so as to increase the pressure to 25 bar.

0.32 g of ammonium persulphate (APS) as initiator agent;

22.3 g of 1,6-diiodoperfluorohexane (C$_6$F$_{12}$I$_2$) as chain transfer agent;

4.28 g of bis-olefin of formula CH$_2$=CH—(CF$_2$)$_6$—CH=CH$_2$; the addition was carried out in 20 portions, each of 0.214 g, starting from the polymerization beginning and for every 5% increase in the monomer conversion, were then introduced in the autoclave.

The 25 bar pressure was maintained constant for the whole duration of the polymerization by feeding a mixture formed by:

| | |
|---|---|
| perfluoromethylvinylether (PMVE) | 40% by moles |
| tetrafluoroethylene (TFE) | 60% by moles |

After 45 minutes of reaction corresponding to 2550 g of elastomer, the autaoclave was cooled and the latex discharged. The latex is coagulated with an aluminum sulphate solution (6 g of Al$_2$(SO$_4$)$_3$ for each litre of latex) and dried at 80° C. in an air-circulating oven for 10 hours. The obtained polymer was characterized as shown in Table 4.

EXAMPLE 7 a) Preparation of the Semicrystalline Fluoropolymer

The PTFE latex was obtained as described in Example 5a. The latex characteristics are reported in Table 3.

b) Preparation of the Fluoroelastomer

The fluoroelastomer latex was obtained as described in Example 5b. The characteristics are reported in Table 3.

c) Mixing of the Latexes—Preparation of the Final Polymer 463 ml of the latex obtained in Example 7a are mixed with 1127 ml of the Example 7b latex. After mixing, the latex is coagulated with an aluminum sulphate solution (6 g of Al$_2$(SO$_4$)$_3$ for each litre of latex) and dried at 80° C. in an air-circulating oven for 10 hours. The obtained polymer was characterized as shown in Table 4.

EXAMPLE 8

The polymer obtained in Example 7c was crosslinked with bis-olefin of formula CH$_2$=CH—(CF$_2$)$_6$—CH=CH$_2$, instead of TAIC. The compound characteristics are reported in Table 4.

EXAMPLE 9 a) Preparation of the Semicrystalline Fluoropolymer

The PTFE latex was obtained as reported in Example 1a. The latex characteristics are reported in Table 5.

b) Preparation of the Fluoroelastomer

In a 10 l autoclave, equipped with a stirrer working at 545 rpm, 6.5 l of demineralized water and 26 g of ammonium perfluorooctanoate were introduced, after evacuation.

The autoclave was then heated up to 80° C. and maintained at said temperature for the whole reaction duration. The following mixture of monomers was then fed:

| | |
|---|---|
| perfluoromethylvinylether (PMVE) | 60% by moles |
| tetrafluoroethylene (TFE) | 40% by moles | so as to increase the pressure to 25 bar.

6.5 g of ammonium persulphate (APS) as initiator agent;

25 g of 1,6-diiodoperfluorohexane (C$_6$F$_{12}$I$_2$) as chain transfer agent;

5 g of bis-olefin of formula CH$_2$=CH—(CF$_2$)$_6$—CH=CH$_2$; the addition was carried out in 20 portions, each of 0.25 g, starting from the polymerization beginning and for every 5% increase in the monomer conversion, were then introduced in the autoclave.

The 25 bar pressure was maintained constant for the whole duration of the polymerization by feeding a mixture formed by:

| perfluoromethylvinylether (PMVE) | 40% by moles |
| tetrafluoroethylene (TFE) | 60% by moles |

After 500 minutes of reaction, the autoclave was cooled and the latex discharged. The latex properties are reported in Table 5.

c) Mixing of the Latexes—Preparation of the Final Polymer 551.5 ml of the latex obtained in Example 9a are mixed with 1393.5 ml of the Example 9b latex. After mixing, the latex is coagulated with an aluminum sulphate solution (6 g of $Al_2(SO_4)_3$ for each litre of latex) and dried at 80° C. in an air-circulating oven for 10 hours. 500 g of polymer, characterized as shown in Table 6, were obtained.

EXAMPLE 10 a) Preparation of the Semicrystalline Fluoropolymer

In a 10 l autoclave, equipped with a stirrer working at 545 rpm, after evacuation, 6.5 l of demineralized water and 65.1 ml of a perfluoropolyoxyalkylene microemulsion were introduced: the latter was previously obtained by mixing:

14.1 ml of a perfluoropolyoxyalkylene, having an acid end group, of formula:

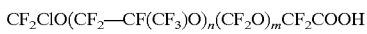
$CF_2ClO(CF_2—CF(CF_3)O)_n(CF_2O)_mCF_2COOH$ wherein n/m=10, having average molecular weight of 600;

14.1 ml of a 30% by volume $NH_4OH$ aqueous solution;
28.2 ml of demineralized water;
8.7 ml of Galden® D02 of formula:

$CF_3O(CF_2—CF(CF_3)O)_n(CF_2O)_mCF_3$ wherein n/m=20, having average molecular weight of 450.

The autoclave was then heated up to 80° C. and maintained at said temperature for the whole reaction duration. The autoclave was pressurized to the pressure of 0.56 bar with ethane and then to the pressure of 25 bar with a monomer mixture constituted by 10% by moles of perfluoromethylvinylether (PMVE) and 90% by moles of tetrafluoroethylene (TFE).

1.3 g of ammonium persulphate (APS) as initiator agent were then introduced in the autoclave. During the reaction the pressure is maintained at 25 bar by continuously feeding the following monomer mixture: 3.5% by moles of PMVE and 96.5% of TFE.

After 60 minutes of reaction, the autoclave was cooled and the latex discharged. The latex characteristics are reported in Table 7.

b) Preparation of the Fluoroelastomer

In a 22 l autoclave, equipped with a stirrer working at 460 rpm, after evacuation, 15 l of demineralized water and 154.5 ml of a perfluoropolyoxyalkylene microemulsion were introduced: the latter was previously obtained by mixing:

33.46 ml of a perfluoropolyoxyalkylene, having an acid end group, of formula:

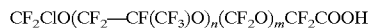
$CF_2ClO(CF_2—CF(CF_3)O)_n(CF_2O)_mCF_2COOH$ wherein n/m=10, having average molecular weight of 600;

33.46 ml of a 30% by volume $NH_4OH$ aqueous solution;
66.93 ml of demineralized water;
20.65 ml of Galden® D02 of formula:

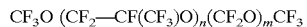
$CF_3O (CF_2—CF(CF_3)O)_n(CF_2O)_mCF_3$ wherein n/m=20, having average molecular weight of 450.

The autoclave was then heated up to 80° C. and maintained at said temperature for the whole reaction duration. The following mixture of monomers was then fed:

| perfluoromethylvinylether (PMVE) | 60% by moles |
| tetrafluoroethylene (TFE) | 40% by moles | so as to increase the pressure to 25 bar.

0.75 g of ammonium persulphate (APS) as initiator agent;
69.24 g of 1,6-diiodoperfluorohexane ($C_6F_{12}I_2$) as chain transfer agent;
11.09 g of bis-olefin of formula $CH_2=CH—(CF_2)_6—CH=CH_2$; the addition was made in 20 portions, each of 0.554 g, starting from the polymerization beginning and for every 5% increase in the monomer conversion, were then introduced in the autoclave.

The 25 bar pressure was maintained constant for the whole duration of the polymerization by feeding a mixture formed by:

| perfluoromethylvinylether (PMVE) | 40% by moles |
| tetrafluoroethylene (TFE) | 60% by moles |

After 110 minutes of reaction, the autoclave was cooled and the latex discharged. The latex properties are reported in Table 7.

c) Mixing of the Latexes—Preparation of the Final Polymer 238 ml of the latex obtained in Example 10a are mixed with 1187 ml of the Example 10b latex. After mixing, the latex is coagulated with an aluminum sulphate solution (6 g of $Al_2(SO_4)_3$ for each litre of latex) and dried at 80° C. in an air-circulating oven for 10 hours. 500 g of polymer, characterized as shown in Table 8, were obtained.

EXAMPLE 11

In a 5 l autoclave, equipped with stirrer working at 630 rpm, after evacuation, 3.5 l of demineralized water and 35 ml of a perfluoropolyoxyalkylene microemulsion were introduced: the latter was previously obtained by mixing:

7.58 ml of a perfluoropolyoxyalkylene, having an acid end group, of formula:

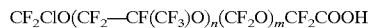
$CF_2ClO(CF_2—CF(CF_3)O)_n(CF_2O)_mCF_2COOH$ wherein n/m=10, having average molecular weight of 600;

7.58 ml of a 30% by volume NH$_4$OH aqueous solution;
15.16 ml of demineralized water;
4.68 ml of Galden® D02 of formula:

$$CF_3O(CF_2-CF(CF_3)O)_n(CF_2O)_mCF_3$$

wherein n/m=20, having average molecular weight of 450.

The autoclave was then heated up to 80° C. and maintained at said temperature for the whole reaction duration. The autoclave was pressurized to the pressure of 0.56 bar with ethane and then to the pressure of 25 bar with a monomer mixture formed by 10% by moles of perfluoromethylvinylether (PMVE) and 90% by moles of tetrafluoroethylene (TFE).

In the autoclave 0.7 g of ammonium persulphate (APS) as initiator agent were then introduced. During the reaction the pressure is maintained at 25 bar by continuously feeding the following monomer mixture: 3.5% by moles of PMVE and 96.5% of TFE.

After 10 minutes of reaction, the autoclave was cooled, degassed and discharged. The latex characteristics are reported in Table 7. Subsequently 747 ml (corresponding to 225 g of polymer) of the latex are introduced again in the 5 litres reactor to which 2.703 litres of demineralized water are added. The autoclave is then heated up to 90° C. and maintained for one hour at said temperature in order to decompose all the residual initiator agent. Subsequently the temperature is brought to 80° C. and maintained constant for the whole duration of the polymerization. The following mixture of monomers was then fed:

| | |
|---|---|
| perfluoromethylvinylether (PMVE) | 60% by moles |
| tetrafluoroethylene (TFE) | 40% by moles | so as to increase the pressure to 25 bar.
- 0.175 g of ammonium persulphate (APS) as initiator agent;
- 11.14 g of 1,6-diiodoperfluorohexane (C$_6$F$_{12}$I$_2$) as chain transfer agent;
- 2.14 g of bis-olefin of formula CH$_2$=CH—(CF$_2$)$_6$—CH=CH$_2$; the addition was carried out in 20 portions, each of 0.107 g, starting from the polymerization beginning and for every 5% increase in the monomer conversion, were then introduced in the autoclave.

The 25 bar pressure was maintained constant for the whole duration of the polymerization by feeding a mixture formed by:

| | |
|---|---|
| perfluoromethylvinylether (PMVE) | 40% by moles |
| tetrafluoroethylene (TFE) | 60% by moles |

After 95 minutes of reaction corresponding to 1275 g of produced elastomer, the autoclave was cooled and the latex discharged.

The latex is coagulated with an aluminum sulphate solution (6 g of Al$_2$(SO$_4$)$_3$ for each litre of latex) and dried at 80° C. in an air-circulating oven for 10 hours. The obtained polymer was characterized as shown in Table 8.

EXAMPLE 12 (comparative)

a) Preparation of the Semicrystalline Fluoropolymer

In a 10 l autoclave, equipped with a stirrer working at 545 rpm, after evacuation, 6.5 l of demineralized water and 16.25 ml of a perfluoropolyoxyalkylene microemulsion were introduced: the latter was previously obtained by mixing:

3.52 ml of a perfluoropolyoxyalkylene, having an acid end group, of formula:

$$CF_2ClO(CF_2-CF(CF_3)O)_n(CF_2O)_mCF_2COOH$$

wherein n/m=10, having average molecular weight of 600;

3.52 ml of a 30% by volume NH$_4$OH aqueous solution;
7.04 ml of demineralized water;
2.17 ml of Galden® D02 of formula:

$$CF_3O(CF_2-CF(CF_3)O)_n(CF_2O)_mCF_3$$

wherein n/m=20, having average molecular weight of 450.

The autoclave was then heated up to 80° C. and maintained at said temperature for the whole reaction duration. The autoclave was pressurized to the pressure of 0.56 bar with ethane and then to the pressure of 25 bar with a monomer mixture formed by 10% by moles of perfluoromethylvinylether (PMVE) and 90% by moles of tetrafluoroethylene (TFE).

In the autoclave 1.3 g of ammonium persulphate (APS) as initiator agent were then introduced.

During the reaction the pressure is maintained at 25 bar by continuously feeding the following monomer mixture: 3.5% by moles of PMVE and 96.5% of TFE.

After 65 minutes of reaction, the autoclave was cooled and the latex discharged. The latex characteristics are reported in Table 7.

b) Preparation of the Fluoroelastomer

The perfluoroelastomer latex was obtained as reported in Example 10b. The latex characteristics are reported in Table 7.

c) Mixing of the Latexes—Preparation of the Final Polymer 233.7 ml of the latex obtained in Example 12a are mixed with 1187 ml of the Example 12b latex. After mixing, the latex is coagulated with an aluminum sulphate solution (6 g of Al$_2$(SO$_4$)$_3$ for each litre of latex) and dried at 80° C. in an air-circulating oven for 10 hours. 500 g of polymer, characterized as shown in Table 8, were obtained.

EXAMPLE 13 a) Preparation of the Semicrystalline Fluoropolymer

The PTFE latex is obtained as reported in Example 9a. The latex properties are reported in Table 9.

b) Preparation of the Fluoroelastomer

In a 10 l autoclave, equipped with stirrer working at 545 rpm, after evacuation, 6.5 l of demineralized water and 65.1 ml of a perfluoropolyoxyalkylene microemulsion were introduced: the latter was previously obtained by mixing:

14.1 ml of a perfluoropolyoxyalkylene, having an acid end group of formula:

$$CF_2ClO(CF_2-CF(CF_3)O)_n(CF_2O)_mCF_2COOH$$

wherein n/m=10, having average molecular weight of 600;

14.1 ml of a 30% by volume NH₄OH aqueous solution;
28.2 ml of demineralized water;
8.7 ml of Galden(®) D02 of formula:

wherein n/m=20, having average molecular weight of 450.

The autoclave was then heated up to 80° C. and maintained at said temperature for the whole reaction duration. The following mixture of monomers was then fed:

| | |
|---|---|
| vinylidene fluoride (VDF) | 28% by moles |
| tetrafluoroethylene (TFE) | 15% by moles |
| hexafluoropropene (HFP) | 57% by moles | so as to increase the pressure to 30 bar.

1.3 g of ammonium persulphate (APS) as initiator agent;

16.17 g of diiodomethane ($CH_2I_2$) as chain transfer agent fed with the following procedure: 20% at the reaction beginning, 40% when the conversion is equal to 20% and 40% when the conversion is equal to 80%;

9 g of bis-olefin of formula $CH_2$=CH—$(CF_2)_6$—CH=$CH_2$; the addition was made in 20 portions, each of 0.45 g, starting from the polymerization beginning and for every 5% increase in the monomer conversion, were then introduced in the autclave.

The 30 bar pressure was maintained constant for the whole duration of the polymerization by feeding a mixture formed by:

| | |
|---|---|
| vinylidene fluoride (VDF) | 50% by moles |
| tetrafluoroethylene (TFE) | 25% by moles |
| hexafluoropropene (HFP) | 25% by moles |

After 270 minutes of reaction, the autoclave was cooled and the latex discharged. The latex properties are reported in Table 9.

c) Mixing of the Latexes—Preparation of the Final Polymer 552 ml of the latex obtained in Example 14a are mixed with 1412 ml of the Example 14b latex. After mixing, the latex is coagulated with an aluminum sulphate solution (6 g of $Al_2(SO_4)_3$ for each litre of latex) and dried at 80° C. in an air-circulating oven for 10 hours. 500 g of polymer, characterized as shown in Table 10, were obtained.

EXAMPLE 14 a) Preparation of the Semicrystalline Fluoropolymer

In a 10 l autoclave, equipped with a stirrer working at 545 rpm, after evacuation, 6.5 l of demineralized water and 130 ml of a perfluoropolyoxyalkylene microemulsion were introduced: the latter was previously obtained by mixing:

28.15 ml of a perfluoropolyoxyalkylene, having an acid end group, of formula:

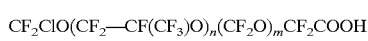

wherein n/m=10, having average molecular weight of 600;

28.15 ml of a 30% by volume NH₄OH aqueous solution;
56.3 ml of demineralized water;
17.4 ml of Galden(®) D02 of formula:

wherein n/m=20, having average molecular weight of 450.

The autoclave was then heated up to 80° C. and maintained at said temperature for the whole reaction duration. The autoclave was pressurized to the pressure of 0.56 bar with ethane and then to the pressure of 20 bar by feeding a monomer mixture formed by 1,8% by moles of perfluoropropylvinylether (PPVE) and 98,2% by moles of tetrafluoroethqylene (TFE).

In the autoclave 1.3 g of ammonium persulphate (APS) were then introduced as initiator. During the reaction the pressure is maintained at 20 bar by continuously feeding the following monomer mixture: 1.8% of PPVE and 98.2% of TFE.

After 18 minutes of reaction, the autoclave was cooled and the latex discharged. The latex characteristics are reported in Table 9.

b) Preparation of the Fluoroelastomer

In a 10 l autoclave, equipped with a stirrer working at 545 rpm, after evacuation, 6.5 l of demineralized water and 65.1 ml of a perfluoropolyoxyalkylene microemulsion were introduced: the latter was previously obtained by mixing:

14.1 ml of a perfluoropolyoxyalkylene, having an acid end group, of formula:

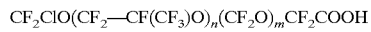

wherein n/m=10, having average molecular weight of 600;

14.1 ml of a 30% by volume NH₄OH aqueous solution;
28.2 ml of demineralized water;
8.7 ml of Galden(®) D02 of formula:

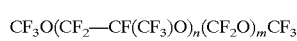

wherein n/m=20, having average molecular weight of 450.

The autoclave was then heated up to 80° C. and maintained at said temperature for the whole reaction duration. The following mixture of monomers was then fed:

| | |
|---|---|
| perfluoromethylvinylether (PMVE) | 60% by moles |
| tetrafluoroethylene (TFE) | 40% by moles | so as to increase the pressure to 25 bar.

0.32 g of ammonium persulphate (APS) as initiator agent;

17 g of 1,6-diiodoperfluorohexane ($C_6F_{12}I_2$) as chain transfer agent;

5 g of bis-olefin of formula $CH_2$=CH—$(CF_2)_6$—CH=$CH_2$; the addition was effected in 20 portions, each of 0.25 g, starting from the polymerization beginning and for every 5% increase in the monomer conversion, were then introduced in the autoclave.

The 25 bar pressure was maintained constant for the, whole duration of the polymerization by feeding a mixture formed by:

| | |
|---|---|
| perfluoromethylvinylether (PMVE) | 40% by moles |
| tetrafluoroethylene (TFE) | 60% by moles |

After 80 minutes of reaction, the autoclave was cooled and the latex discharged. The latex properties are reported in Table 9.

Mixing of the Latexes—Preparation of the Final Polymer 528 ml of the latex obtained in Example 15a are mixed with 1218 ml of the Example 15b latex. After mixing, the latex is coagulated with an aluminum sulphate solution (6 g of $Al_2(SO_4)_3$ for each litre of latex) and dried at 80° C. in an air-circulating oven for 10 hours. 500 g of polymer, characterized as shown in Table 10, were obtained.

TABLE 1

| | Latex concentration (g/l) | Particle diameter (nm) | MFI[(1)] ASTM D 1238 | Mooney $(1 + 10)^{121° C.}$ ASTM D 1646 |
|---|---|---|---|---|
| Example 1a | 118 | 12 | 82.7 | — |
| Example 1b | 280 | 54 | — | 27 |
| Example 2a (comp.) | 175 | 197 | 0.2 | — |
| Example 2b (comp.) | 280 | 54 | — | 27 |

(1) MFI has been determined at 380° C. with 3 Kg

TABLE 2

| EXAMPLE | | Ex.1c | Ex.2c comp. | Ex.3c comp. | Ex.4 comp. |
|---|---|---|---|---|---|
| % by weight of plastomer | | 15 | 15 | 15 | 15 |
| ML $(1 + 10)^{121° C.}$ (ASTM D 1646) | | 58 | nd | 27 | — |
| Formulation: | | | | | |
| Elastomer | (phr) | 100 | 100 | 100 | 100 |
| TAIC | " | 1.5 | 1.5 | 1.5 | 1.5 |
| Luperco | " | 2 | 2 | 2 | 2 |
| ZnO | " | 5 | 5 | 5 | 5 |
| ODR (177° C., 12'arc 3°) (ASTM D2084-81): | | | | | |
| ML | Lbf.in. | 11 | nd | 17 | 13 |
| MH | " | 118 | nd | 115 | 140 |
| Ts2 | sec | 45 | nd | 45 | 51 |
| T'90 | " | 99 | nd | 90 | 109 |
| Molding in press at 180° C. for 10 min: | | | | | |
| Sheet surface | | smooth | nd | rough | rough |
| Mechanical properties after post cure at 200° C. for 1 hour (ASTM D 412-83): | | | | | |
| M100 | Mpa | 4.9 | nd | 10.1 | 6.3 |
| C.R. | " | 19.3 | nd | 18.5 | 18.7 |
| A.R. | % | 174 | nd | 145 | 174 |
| ShA Hardness | points | 69 | nd | 85 | 76 |
| Compression set on O-ring (ASTM D 395): | | | | | |
| 200° C. for 70 hours (%) | | 29 | nd | 40 | broken |
| 230° C. for 70 hours (%) | | 47 | nd | broken | — |

TABLE 3

| | Latex concentration (g/l) | Particle diameter (nm) | MFI[(1)] ASTM D 1238 | Mooney $(1 + 10)^{121° C.}$ ASTM D 1646 |
|---|---|---|---|---|
| Example 5a | 216 | 90 | 2 | — |
| Example 5b | 355 | 60 | — | 20 |
| Example 6 | 190 | 50 | 54.1 | — |
| Example 7a | 216 | 90 | 2 | — |
| Example 7b | 355 | 60 | — | 18 |

[(1)]MFI has been determined at 380° C. with 3 Kg

TABLE 4

| EXAMPLE | | Ex.5c | Ex.6 | Ex.7c | Ex.8 |
|---|---|---|---|---|---|
| % by weight of plastomer | | 15 | 15 | 20 | 20 |
| ML $(1 + 10)^{121° C.}$ (ASTM D 1646) | | 35 | 39 | 41 | 35 |
| Formulation: | | | | | |
| Elastomer | (phr) | 100 | 100 | 100 | 100 |
| TAIC | " | 1.5 | 1.5 | 1.5 | — |
| BO[(2)] | | — | — | — | 4 |
| Luperco | " | 2 | 2 | 2 | 4 |
| ZnO | " | 5 | 5 | 5 | 5 |
| ODR (177° C., 12'arc 3°) (ASTM D2084-81): | | | | | |
| ML | Lbf.in. | 8 | 6 | 12 | 4 |
| MH | " | 131 | 108 | 133 | 77 |
| Ts2 | sec | 45 | 52 | 60 | 78 |
| T'90 | " | 285 | 138 | 123 | 330 |
| Molding in press at 180° C. for 10 min: | | | | | |
| Sheet surface | | smooth | smooth | smooth | smooth |
| Mechanical properties after post cure at 200° C. for 1 h (ASTM D 412-83): | | | | | |
| M100 | Mpa | 5.6 | 4.5 | 7.9 | 10.1 |
| C.R. | " | 16.4 | 16.9 | 18.4 | 18.5 |
| A.R. | % | 164 | 190 | 154 | 145 |
| ShA Hardness | points | 73 | 72 | 78 | 85 |
| Compression set on O-ring (ASTM D 395): | | | | | |
| 200° C. for 70 hours (%) | | 28 | 49 | 33 | 43 |

[(2)]Bisolefin of formula $CH_2=CH-(CF_2)_6-CH=CH_2$

TABLE 5

| | Latex concentration (g/l) | Particle diameter (nm) | MFI ASTM D 1238 | Mooney $(1 + 10)^{121° C.}$ ASTM D 1646 |
|---|---|---|---|---|
| Example 9a | 136 | 12 | 82.7[(1)] | — |
| Example 9b | 305 | 163 | — | 38 |

[(1)]MFI has been determined at 380° C. with 3 Kg

TABLE 6

| EXAMPLE | | Ex. 9c |
|---|---|---|
| % by weight of plastomer | | 15 |
| ML $(1 + 10)^{121° C.}$ (ASTM D 1646) | | 48 |
| Formulation: | | |
| Elastomer | (phr) | 100 |
| TAIC | " | 1.5 |
| Luperco | " | 2 |
| ZnO | " | 5 |

TABLE 6-continued

| EXAMPLE | | Ex. 9c |
|---|---|---|
| ODR (177° C., 12'arc 3°) (ASTM D2084-81): | | |
| ML | Lbf.in. | 11 |
| MH | " | 95 |
| Ts2 | sec | 48 |
| T'90 | " | 103 |
| Molding in press at 180° C. for 10 min: | | |
| Sheet surface | | smooth |
| Mechanical properties after post cure at 200° C. for 1 hour (ASTM D 412-83): | | |
| M100 | Mpa | 6.3 |
| C.R. | " | 22.2 |
| A.R. | % | 184 |
| ShA hardness points | | 73 |
| Compression set on O-ring (ASTM D 395): | | |
| 200° C. for 70 hours (%) | | 47 |

TABLE 7

| | Latex concentration (g/l) | Particle diameter (nm) | MFI ASTM D 1238 | Mooney $(1 + 10)^{121° C.}$ ASTM D 1646 |
|---|---|---|---|---|
| Example 10a | 315 | 60 | 295[1] | — |
| Example 10b | 358 | 54 | — | 15 |
| Example 11 | 301 | 26 | 216[2] | — |
| Ex.12a comp. | 321 | 103 | 245[1] | — |
| Ex.12b comp. | 358 | 54 | — | 15 |

[1]MFI has been measured at 372° C. with 5 Kg
[2]MFI has been measured at 372° C. with 10 Kg

TABLE 8

| EXAMPLE | | Ex.10c | Ex.11 | Ex.12c comp. |
|---|---|---|---|---|
| % by weight of plastomer | | 15 | 15 | 15 |
| ML(1 + 10)$^{121° C.}$ (ASTM D 1646) | | 27 | 55 | 28 |
| Formulation: | | | | |
| Elastomer | (phr) | 100 | 100 | 100 |
| TAIC | " | 1.5 | 1.5 | 1.5 |
| Luperco | " | 2 | 2 | 2 |
| ZnO | " | 5 | 5 | 5 |
| ODR (177° C., 12'arc 3°) (ASTM D2084-81): | | | | |
| ML | Lbf.in. | 5 | 20 | 5 |
| MH | " | 129 | 134 | 83 |
| Ts2 | sec | 54 | 46 | 54 |
| T'90 | " | 114 | 97 | 99 |
| Molding in press at 180° C. for 10 min: | | | | |
| Sheet surface | | smooth | smooth | rough |
| Mechanical properties after post cure at 200° C. for 1 hour (ASTM D 412-83): | | | | |
| M100 | Mpa | 5.7 | 7.1 | 6.6 |
| C.R. | " | 16.4 | 19.0 | 18.4 |
| A.R. | % | 175 | 183 | 177 |
| ShA hardness points | | 70 | 79 | 73 |
| Compression set on O-ring (ASTM D 395): | | | | |
| 200° C. for 70 hours (%) | | 29 | 47 | — |

TABLE 9

| | Latex concentration (g/l) | Particle diameter (nm) | MFI ASTM D 1238 | Mooney $(1 + 10)^{121° C.}$ ASTM D 1646 |
|---|---|---|---|---|
| Example 13a | 136 | 12 | 29.1[1] | — |
| Example 13b | 301 | 72 | — | 51 |
| Example 14a | 142 | 60 | 80[2] | — |
| Example 14b | 349 | 54 | — | 68 |

[1]MFI has been measured at 380° C. with 3 Kg
[2]MFI has been measured at 372° C. with 5 Kg

TABLE 10

| EXAMPLE | | Ex.13c | Ex.14c |
|---|---|---|---|
| % by weight of plastomer | | 15 | 15 |
| ML (1 + 10)$^{121° C.}$ (ASTM D 1646) | | 73 | 73 |
| Formulation: | | | |
| Elastomer | (phr) | 100 | 100 |
| TAIC | " | 3 | 1.5 |
| Luperco | " | 4 | 2 |
| ZnO | " | 5 | 5 |
| ODR (177° C., 12'arc 3°) (ASTM D2084-81): | | | |
| ML | Lbf.in. | 12 | 30 |
| MH | " | 96 | 130 |
| Ts2 | sec | 55 | 55 |
| T'90 | " | 115 | 118 |
| Molding in press at 180° C. for 10 min: | | | |
| Sheete surface | | smooth | smooth |
| Mechanical properties after post cure at 200° C. for 1 hour (ASTM D 412-83): | | | |
| M100 | Mpa | 4 | 6.2 |
| C.R. | " | 16.5 | 15.0 |
| A.R. | % | 344 | 164 |
| ShA hardness points | | 65 | 73 |
| Compression set on O-ring (ASTM D 395): | | | |
| 200° C. for 70 hours (%) | — | 32 |

What is claimed is:

1. Fluoropolymers comprising a fluoroelastomer matrix incorporating therein particles of a semicrystalline fluoropolymer latex formed by tetrafluoroethylene (TFE) homopolymers, or TFE copolymers with one or more monomers containing at least one unsaturation of ethylene type in amounts ranging from 0.01% to 10% by moles wherein the average particle sizes of the semicrystalline fluoropolymer latex range from 10 to 100 nm for at least 60% by weight of the semicrystalline fluoropolymer.

2. Fluoropolymers according to claim 1 wherein the latex particle sizes of the semicrystalline fluoropolymer range from 10 to 60 nm.

3. Fluoropolymers according to claim 1 obtainable by mixing the semicrystalline fluoropolymer latex with the fluoroelastomer latex and subsequent coagulation.

4. Fluoropolymers according to claim 1 obtainable by polymerizing in a first step the semicrystalline fluoropolymer and in a second step the fluoroelastomer.

5. Fluoropolymers according to claim 1 wherein the semicrystalline fluoropolymer amount inside the fluoroelastomer matrix is in the range 2%–40% by weight on the total of the polymeric mixture.

6. Fluoropolymers according to claim 5 wherein the semicrystalline fluoropolymer amount inside the fluoroelastomer matrix is in the range 5–30% by weight on the total of the polymeric mixture.

7. Fluoropolymers according to claim 1 wherein the semicrystalline polymer is based on PTFE modified with comonomers with ethylene unsaturation both of hydrogenated and fluorinated type.

8. Fluoropolymers according to claim 7 wherein the hydrogenated comonomers are selected from ethylene, propylene, methylmethacrylate, methacrylic acid, butylacrylate, hydroxyethylhexylacrylate, styrene.

9. Fluoropolymers according to claim 7 wherein the fluorinated comonomers are selected from:

perfluoroolefins $C_3$–$C_8$;
hydrogenated fluorolefins $C_2$–$C_8$;
chloro- and/or bromo- and/or iodo-fluoroolefins $C_2$–$C_8$;
(per)fluoroalkylvinylethers (PAVE) $CF_2$=$CFOR_f$, wherein $R_f$ is a (per)fluoroalkyl $C_1$–$C_6$;
(per)fluoro-oxyalkylvinylethers $CF_2$=$CFOX$, wherein X is: an alkyl $C_1$–$C_{12}$, or an oxyalkyl $C_1$–$C_{12}$, or a (per)fluoro-oxyalkyl $C_1$–$C_{12}$ having one or more ether groups; fluorodioxoles.

10. Fluoropolymers according to claim 7 wherein the comonomers are selected from the group consisting of perfluoromethyl-, ethyl-, propyl-vinylether and perfluorodioxoles.

11. Fluoropolymers according to claim 1 wherein the fluoroelastomer is selected from the following classes:

(1) vinylidene fluoride (VDF)-based copolymers, wherein VDF is copolymerized with at least one comonomer selected from the group consisting of perfluoroolefins $C_2$–$C_8$; chloro- and/or bromo- and/or iodo-fluoroolefins $C_2$–$C_8$; (per)fluoroalkyl-vinylethers (PAVE) $CF_2$=$CFOR_f$, wherein $R_f$ is a (per)fluoroalkyl $C_1$–$C_6$; perfluoro-oxyalkylvinylethers $CF_2$=$CFOX$, wherein X is a perfluoro-oxyalkyl $C_1$–$C_{12}$ having one or more ether groups; non fluorinated olefins (Ol) $C_2$–$C_8$;

(2) tetrafluoroethylene (TFE) -based copolymers, wherein TFE is copolymerized with at least one comonomer selected from the group consisting of (per)fluoroalkylvinylethers (PAVE) $CF_2$=$CFOR_f$, wherein $R_f$ is as above defined; perfluoro-oxyalkylvinylethers $CF_2$=$CFOX$, wherein X is as above defined; fluoroolefins $C_2$–$C_8$ containing hydrogen and/or chlorine and/or bromine and/or iodine atoms; non fluorinated olefins (Ol) $C_2$–$C_8$; perfluorovinylethers containing hydrocyanic groups.

12. Fluoropolymers according to claim 11 wherein the preferred fluoroelastomer is selected from the following compositions expressed by moles:

(a) vinylidene fluoride (VDF) 45–85%, hexafluoropropene (HFP) 15–45%, tetrafluoroethylene (TFE) 0–30%;

(b) vinylidene fluoride (VDF) 50–80%, perfluoroalkylvinylether (PAVE) 5–50%, tetrafluoroethylene (TFE) 0–20%;

(c) vinylidene fluoride (VDF) 20–30%, non fluorinated olefins (Ol) $C_2$–$C_8$10–30%, hexafluoropropene (HFP) and/or perfluoroalkylvinylether (PAVE) 18–27%, tetrafluoroethylene (TFE) 10–30%;

(d) tetrafluoroethylene (TFE) 50–80%, perfluoroalkylvinylether (PAVE) 20–50%;

(e) tetrafluoroethylene (TFE) 45–65%, non fluorinated olefins (Ol) $C_2$–$C_8$20–55%, vinylidene fluoride 0–30%;

(f) tetrafluoroethylene (TFE) 32–60% by moles, non fluorinated olefins (Ol) $C_2$–$C_8$10–40%, perfluoroalkylvinylether (PAVE) 20–40%;

(g) tetrafluoroethylene (TFE) 33–75%, perfluoroalkylvinylether (PAVE) 15–45%, vinylidene fluoride (VDF) 5–30%.

13. Fluoropolymers according to claim 1 wherein the fluoroelastomer comprises also monomer units deriving from a bis-olefin having general formula:

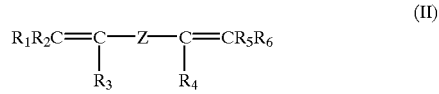

(II)

wherein:

$R_1$, $R_2$, $R_3$, $R_4$, $R_5$, $R_6$, equal to or different from each other, are H or alkyls $C_1$–$C_5$;

Z is a linear or branched, alkylene or cycloalkylene $C_1$–$C_{18}$ radical, optionally containing oxygen atoms, preferably at least partially fluorinated, or a (per) fluoropolyoxyalkylene radical.

14. Fluoropolymers according to claim 13 wherein the unit amount in the chain deriving from the bis-olefin is in the range 0.01–1.0% by moles of the other monomer units forming the fluoroelastomer base structure.

15. Fluoropolymers according to claim 1 wherein the fluoroelastomers are cured by peroxidic route.

16. Fluoropolymers according to claims 1 wherein the fluoroelastomers when they contain cyano groups are cured by tin organic compounds and/or di-aromatic aminic compounds.

17. Fluoropolymers according to claim 16 wherein the fluoroelastomers are cured by tin organic compounds and/or di-aromatic aminic compounds and optionally by peroxidic route if in the polymeric chain iodine and/or bromine atoms are present.

18. Fluoropolymer according to claim 1 wherein the TFE copolymers have one or more monomers containing at least one unsaturation of ethylene type in amounts ranging from 0.05% to 5% by moles.

19. Fluoropolymer according to claim 9 wherein the fluorinated comonomers are selected from:

hexafluoropropene (HFP), hexafluoroisobutene;
vinylfluoride (VF); vinylidene fluoride (VDF); trifluoroethylene; perfluoroalkylethylene $CH_2$=$CH$—$R_f$ wherein $R_f$ is a perfluoroalkyl $C_1$–$C_6$;
chlorotrifluoroethylene (CTFE);
perfluoroalkylvinylethers (PAVE) $CF_2$=$CH$-$R_f$ wherein $R_f$ is $CF_3$, $C_2F_5$, $C_3F_7$;
perfluoro-2-propoxy-propyl.

20. Fluoropolymer according to claim 11 wherein the fluoroelastomer is selected from the following classes:

(1) vinylidene fluoride (VDF) -based copolymers, wherein VDF is copolymerized with at least one comonomer selected from the following ones: tetrafluoroethylene (TFE), hexafluoropropene (HFP), chlorotrifluoro-ethylene (CTFE), bromotrifluoroethylene; perfluoro-alkylvinylethers (PAVE) $CF_2$=$CFOR_f$, wherein $R_f$ is trifluoromethyl, bromotrifluoromethyl, pentafluoro-propyl; perfluorooxyalkylvinylethers $CF_2$=$CFOX$ wherein X is perfluoro-2-propoxy-propyl; ethylene, propylene;

(2) tetrafluoroethylene (TFE) -based copolymers, wherein TFE is copolymerized with at least one comonomer selected from the following: (per)fluoroalkylvinylethers (PAVE) $CF_2$=$CFOR_f$, wherein $R_f$ is as above defined; perfluoro-oxyalkylvinylethers $CF_2=CFOX$, wherein X is as above defined; fluoroolefins $C_2$–$C_8$ containing hydrogen and/or chlorine and/or bromine and/or iodine atoms; non fluorinated olefins (Ol) $C_2$–$C_8$; perfluorovinylethers containing hydrocyanic groups.

21. A sealing manufactured article comprising the fluoropolymer according to claim 1.

22. The sealing manufactured article according to claim 21, wherein the sealing manufactured article is an O-ring.

* * * * *